United States Patent
Reddy et al.

(10) Patent No.: US 12,477,158 B2
(45) Date of Patent: Nov. 18, 2025

(54) SYSTEM FOR CLOUD-BASED SHARED VIRTUAL STUDIO

(71) Applicant: LightTwist Inc., Boulder, CO (US)

(72) Inventors: Vikas Muppidi Reddy, Boulder, CO (US); Gustavo Buzogany Eboli, Zurich (CH)

(73) Assignee: LightTwist Inc., Boulder, CO (US)

( * ) Notice: Subject to any disclaimer, the term of this patent is extended or adjusted under 35 U.S.C. 154(b) by 115 days.

(21) Appl. No.: 18/532,423

(22) Filed: Dec. 7, 2023

(65) Prior Publication Data

US 2024/0196023 A1    Jun. 13, 2024

Related U.S. Application Data

(60) Provisional application No. 63/386,515, filed on Dec. 8, 2022.

(51) Int. Cl.
| | |
|---|---|
| H04N 21/2187 | (2011.01) |
| G06T 7/194 | (2017.01) |
| G06T 17/00 | (2006.01) |
| H04N 21/431 | (2011.01) |

(52) U.S. Cl.
CPC ......... *H04N 21/2187* (2013.01); *G06T 7/194* (2017.01); *G06T 17/00* (2013.01); *H04N 21/4312* (2013.01)

(58) Field of Classification Search
None
See application file for complete search history.

(56) References Cited

U.S. PATENT DOCUMENTS

| | | | |
|---|---|---|---|
| 2008/0190271 A1* | 8/2008 | Taub | G10H 1/0058 84/645 |
| 2008/0201424 A1* | 8/2008 | Darcie | H04N 7/15 709/204 |
| 2009/0106429 A1* | 4/2009 | Siegal | G11B 27/034 709/227 |
| 2009/0113022 A1* | 4/2009 | Quoc | H04N 21/42203 709/218 |
| 2009/0164034 A1* | 6/2009 | Cohen | G10H 1/0025 700/94 |
| 2010/0281503 A1* | 11/2010 | DeLorme | H04N 7/17327 725/115 |
| 2012/0311448 A1* | 12/2012 | Achour | G06Q 10/101 715/723 |
| 2017/0251172 A1* | 8/2017 | McNelley | G09G 5/00 |
| 2020/0410746 A1* | 12/2020 | Shin | H04N 13/383 |
| 2022/0182251 A1* | 6/2022 | Jacobs | H04N 21/4821 |
| 2022/0210514 A1* | 6/2022 | McBeth | H04N 21/44226 |
| 2022/0295012 A1* | 9/2022 | Swierk | G06N 3/045 |
| 2022/0343951 A1* | 10/2022 | Levin | G06T 19/006 |
| 2024/0267312 A1* | 8/2024 | Bailey | H04L 65/403 |

* cited by examiner

*Primary Examiner* — Alexander Q Huerta
(74) *Attorney, Agent, or Firm* — Lee & Hayes, P.C.

(57) ABSTRACT

A system for facilitating and generating virtual studio environments and visual content in which physical separated participants appear to a viewer within a shared physical environment. The system may allow for both live streaming content as the live studio environment is rendered and for production of a post recording streaming content for publication to various streaming services.

20 Claims, 11 Drawing Sheets

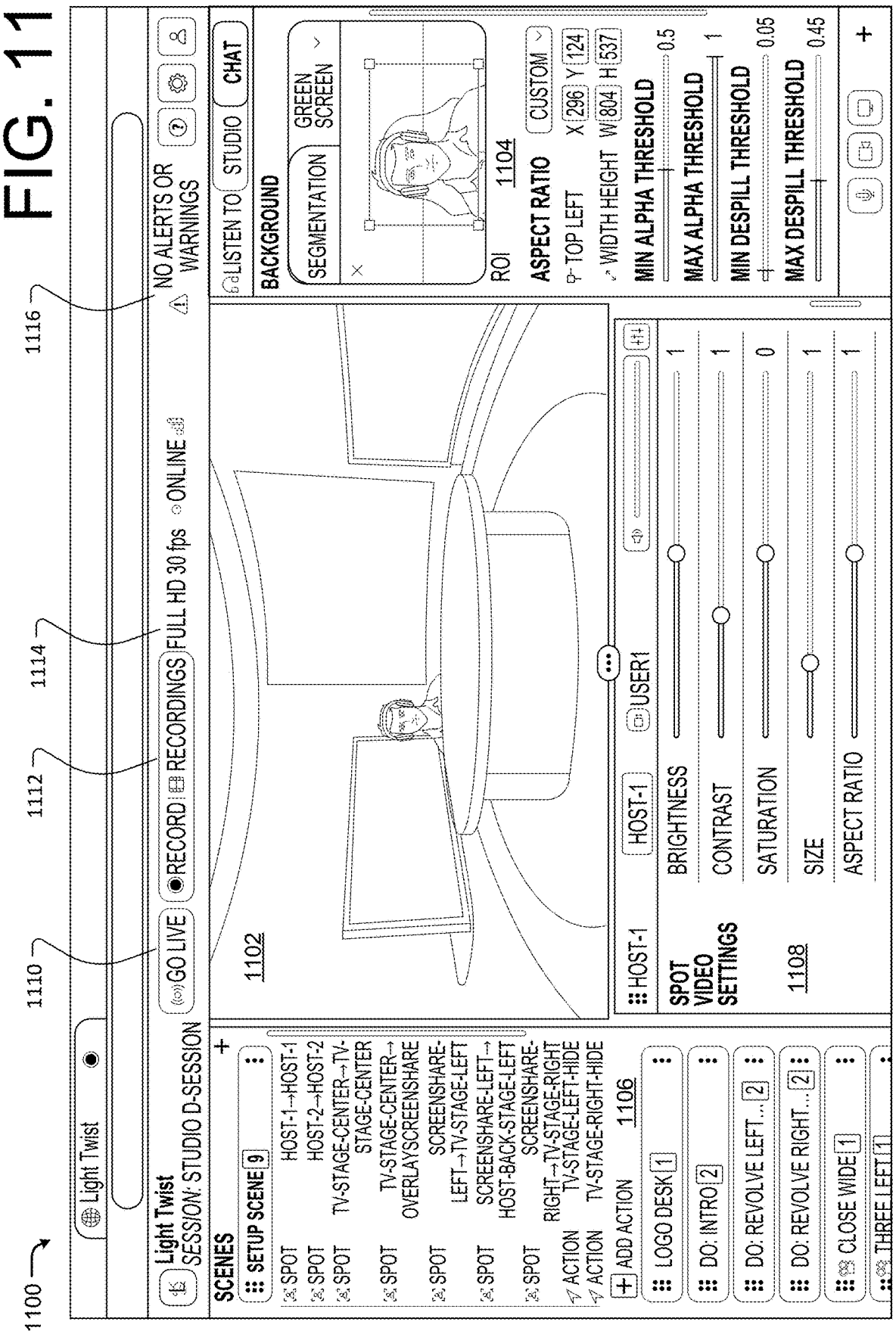

SYSTEM FOR CLOUD-BASED SHARED VIRTUAL STUDIO

CROSS-REFERENCE TO RELATED APPLICATION(S)

This application claims priority to U.S. Provisional Application No. 63/386,515 filed on Dec. 8, 2022 and entitled "SYSTEM FOR CLOUD BASED VIRTUAL ENVIRONMENTS," which is incorporated herein by reference in its entirety.

BACKGROUND

Today, the presence of remote and computer-based collaboration and virtual reality systems has become more and more common. However, most computer-based collaboration systems are designed to replicate physically meeting, face to face conversations, or the like. These conventional computer-based collaboration system typical generate visual content or image data that represents each participant in a meeting in their own physical environment, such as via a separate tile, window, or space. Accordingly, participants do not typically interact with each other and viewers of the visual content are acutely aware of the physical separation between the participants.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 11 is another example pictorial diagram illustrating an example portion of a user interface associated with a cloud-based system for rendering a virtual studio environment for remote participants according to some implementations.

DETAILED DESCRIPTION

Figure 1:
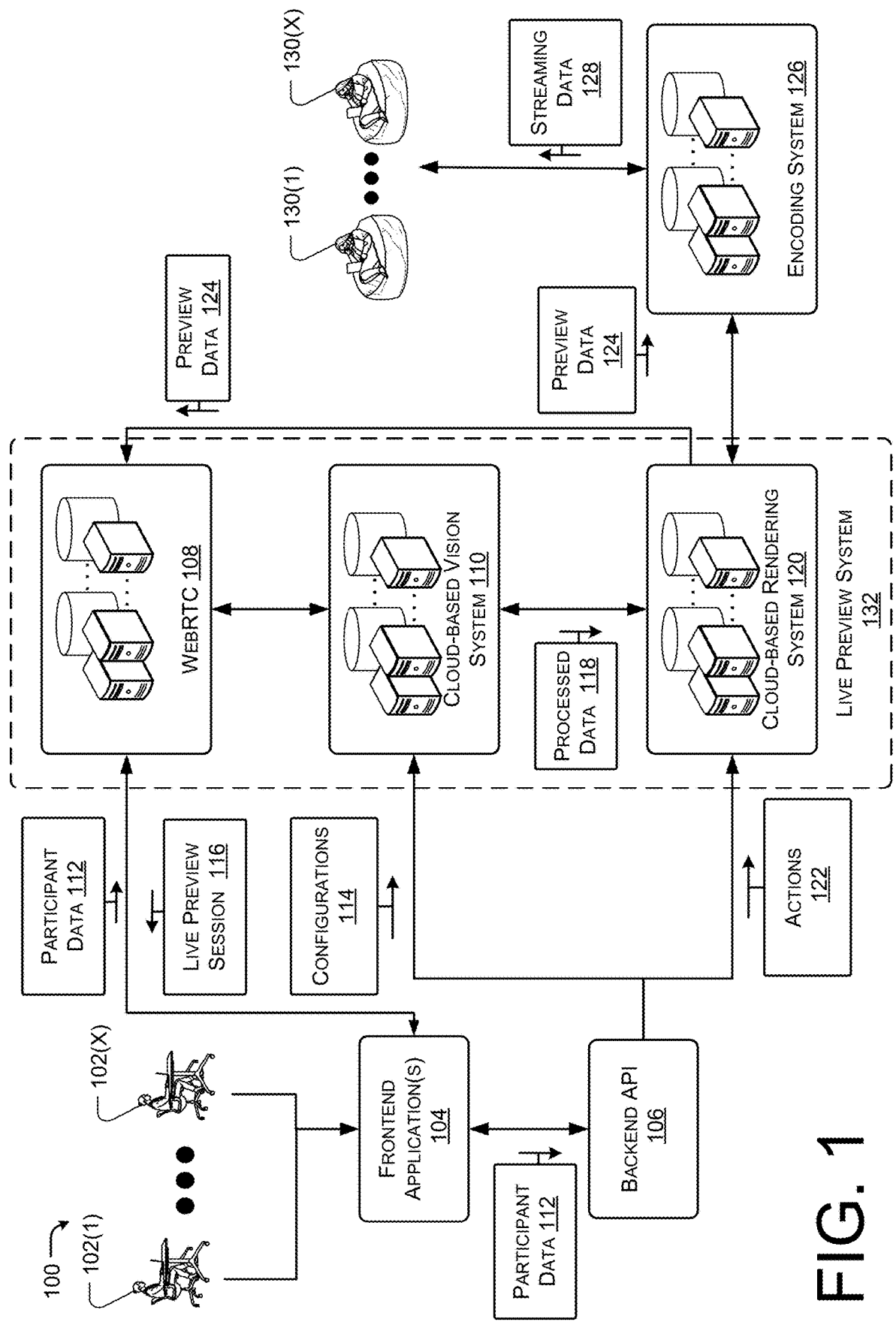
FIG. 1 illustrates an example of a cloud-based system for generating live streaming sessions for remote participants in a virtual studio setting according to some implementations.

This disclosure includes systems, techniques, and implementations for facilitating and generating virtual studios or visual content in which physically separated participants appear to a viewer within a shared physical environment, such as a video or production studio. In this manner, the system, discussed herein, may allow for a cloud-based remote virtual video studio in which participants (e.g., hosts, guests, audiences, and the like) may appear to a viewer within a virtual shared physical environment. Accordingly, the system discussed herein, unlike conventional video production, allows for video production without requiring hassle and costs of being physically co-located, hiring videographers, stagers, and special effects artists, renting studios or sets, and the like. The system, discussed herein, also improves on conventional virtual meeting software by allowing the participants to appear to viewers within the same physical environment and to allow for shared participant interactions with the set and each other to more effectively re-create a shared physical environment or studio.

In some examples, the system, discussed herein, may be configured to enable participants to virtually render a studio setting, backgrounds, props, and the like in a high quality manner without a team of software developers having extensive knowledge of game engines, virtual production techniques, and three-dimensional rendering software. The system may include a cloud-based or web-based interface that allows for a virtual studio, environment control interface, and editing interface for the creation of studio production visual content including two or more remote participants. For example, the system may include a web-based or cloud-based user interface that is hosted on a participant's computing device during a recording session. The cloud-based user interface may include a plurality of control options as well as instructions for use of recording image data via an image device local to the computing device (e.g., a webcam or device equipped/built-in-camera). In some cases, the plurality of control options may include options to trigger or program studio events (e.g., play pre-recorded video clips, add animation, add sound effects, and the like), visual controls (e.g., lighting, color, contrast, and the like), position participants relative to the studio, adjust image device settings (e.g., angles, width, shutters, zooms, and the like), as well as other control options.

The cloud-based user interface may also include a web application that acts as a front end on the participant's computing device that is in communication with a backend web application API system. The front end may provide the captured image data and audio data as well as any metadata, any user interactions or inputs with the user interface, or the like to the cloud-based backend.

The front end may also provide the image data and audio data to a Web Real-Time Communication (WebRTC) system that allows for multiple participants and/or viewers to consume the image data and the audio data as part of a single live streaming session or as a live preview streaming session. Both the backend and the WebRTC system may be in communication with a cloud-based vision system that may apply one or more processes to the image data and/or the audio data. For example, the backend system may generate or select, based at least in part on the image data and/or video data, configurations or processes to be applied to the image data and/or the audio data for each participant by the vision system. For instance, the configurations or processes may include one or more of a machine learned model based background segmentation (e.g., via a deep learning model or the like trained on image data including visual representation of users and various types of backgrounds in various lighting settings from multiple systems), greenscreen removal processes (such as via a deep learning model trained on green screen examples, segmented end-to-end results or video content, video data with varying lighting effects or conditions, video data with varying green screen wrinkles, shadows, or other imperfect conditions), discussed in more detail herein, avatar motion capture, three-dimensional (3D) human construction (e.g., avatar construction), audio processing for noise removal, audio processing to improve audio quality, object (e.g., background and human) resizing, cropping, arrangement, and the like, and the like. Accordingly, after applying the selected configurations and/or processes to the image data and audio data for each participant, the vision system may generate processed image data and processed audio data for each participant.

The backend and the cloud-based vision system may also be in communication with a cloud-based rendering system. The cloud-based vision system may provide the processed image data and the processed audio data for each participant to the rendering system and the backend may again determine actions or processes to be performed on the processed image data and the processed audio data for each participant by the rendering system based at least in part on the image data and/or audio data from each participant and/or the live preview streaming session being currently rendered by the WebRTC system and viewed by the one or more participants. For example, the cloud-based rendering system may apply a game application or simulation engine (such as a 3D real-time simulation, 3D animation rendering engine, architectural visualization, background generation, illumination rendering, physical-based-rendering (PBR), 3D object rendering and interaction engine, and the like) to render a virtual 3D studio or background including animations and/or actions that may be triggered by one or more of the participants during a recording session.

The cloud-based rendering system may also be configured to synchronize the processed image data and the processed audio data for each participant and to insert the image data of each participant into the rendered background studio. In this manner, the rendering system may generate a rendered and combined image data and audio data session that includes image data and audio data from each participant in a single virtual environment or background (e.g., studio) that is rendered in substantially real-time once the live streaming session is initiated.

In some cases, the cloud-based rendering system (and/or the actions selected by the backend) may also include user accessible information such as available image devices (camera angles) for each participant, locations within the rendered studio that each participant can be inserted or mapped to, and any available animations for use during the session. In some cases, the user accessible information may be provided to one or more of the participants during a session initiation period prior to entering a live stream event and/or live preview event, such that one or more of the participants may select image devices, camera angles, participant mapping locations, and animations that may be utilized during the live streaming session and/or live preview session.

The rendered and combined image data and audio data may be provided to the WebRTC system for providing a live preview of the streaming session to the participants, such as during the initiation period. During the initiation period, one or more of the participants may be able to access or control other participants image devices, microphones, displays, screenshares, and the like, map participants to locations within the rendered studio or environment, upload image spots and/or audio tracks (e.g., videos, clips, stills, audio sounds, or other visual/audio tracks or spots) and/or place the uploaded image spots and/or audio tracks within the rendered studio or environment, select streaming services or applications for the live session, set or select greenscreen background segmentation options (e.g., background removal), adjust settings such as audio levels, brightness, and the like for each individual participant, select features for the rendered studio or environment (e.g., color palette, lighting, theme, tables, desks, virtual displays, and other look and feel decisions), and the like. In this manner, the participants may preconfigure the live stream session while viewing or consuming the live preview of the rendered studio or environment.

Once a live stream session is initiated for viewing by one or more viewers, the cloud-based rendering system may also provide the rendered and combined image data and audio data to a video encoding system to encode the rendered and combined image data and audio data into a final production data for post production streaming or posting to a website, social media account, or other hosted service. The video encoding system may generate the final production data as a session for use at a later time (such as additional post editing and further publication as discussed above).

In some implementations, the cloud-based rendering system may also include post recording production services and/or systems. For example, the system may provide one or more of the participants a user interface system for consuming, viewing, and editing a timeline of the live stream session and/or live preview session. For instance, the timeline user interface may include icons representing studio events (e.g., inserted audio clips, inserted video clips, production effects, lighting changes, and the like) alongside the image data and audio data for each participant. In this manner, the editor may consume or move through the combined live preview session and determine if any of the studio events are misaligned with the image data and audio data for each participant. For instance, during the live preview session one of the participants may have activated a studio event (e.g., a video clip or audio clip, or the like) while one of the participants were still talking (e.g., the studio event as indicated too soon). Using the post recording production services and/or systems timeline interface, the editor may adjust the timing of the studio event and/or the output of the image data and audio data of one or more of the participants to more accurately align the studio events and the image data and audio data tracks resulting in a high quality final output.

In some cases, the post recording production services and/or systems may also include an interface for the editor to concurrently view the recorded and rendered output of the encoding system associated with the live preview session, the image data and audio data for each participant, the studio event timeline, any selected settings or rendering options, and the like. In this manner, the editor may move through the recording of the live preview session and adjust settings, rendering options (e.g., avatar motion capture, three-dimensional (3D) human construction (e.g., lighting, participant position relative to the studio, object insertion or position relative to the studio and/or participants, avatar construction, audio processing, audio, object (e.g., background and human) resizing, cropping, arrangement, 3D real-time simulation, 3D animation rendering engine, architectural visualization, background generation, illumination rendering, physical-based-rendering (PBR), 3D object rendering, ad interactions, studio events, and the like. The post recording production services and/or systems may also allow the editor to apply additional computer vision and/or rendering options.

Once the post recording selections and edits are complete, the system may provide the post recording content data as well as any settings to an offline vision and/or rendering system. In some cases, the offline vision and/or rendering system may be the same rendering system and the vision system used during the live preview session. However, in other examples, the offline vision and/or rendering system may be a separate rendering system. The offline vision and/or rendering system may utilize the original image data and audio data from each participant, the live preview session output data, and any edits made during the post recording sessions by the editor, to re-render a combined and rendered data representing the final production data of the live session. The combined and rendered data representing the final production data of the live session may then be sent to the encoding service for preparing a post-production final content that may be published to various locations, such as social media services, news services, podcasts, streaming services, and the like.

FIG. 1 illustrates an example of a cloud-based system 100 for generating live streaming sessions for remote participants, such as participants 102(A)-(X), in a virtual studio setting according to some implementations. As discussed above, the system 100 may be configured for allowing the participants 102 to generate virtual studios or visual content in which the physically separated participants 102 appear to a viewer, consuming the visual content, within a shared physical environment, such as a video or production studio. In this manner, the system 100 may allow for a cloud-based remote virtual video studio in which the participants 102 appear to the viewer within a virtual shared physical environment rendered by the system 100. Accordingly, the system 100, unlike conventional video production, allows for video production without requiring hassle and costs of being physically co-located, hiring videographers, stagers, and special effects artists, renting studios or sets, and the like.

In some cases, the system 100 may be configured to enable participants to virtually render, during a live streaming session and/or a live preview session 116, a studio setting, backgrounds, props, and the like in a high quality manner without a team of software developers having extensive knowledge of game engines, virtual production techniques, and three-dimensional rendering software. The system 100 may include a cloud-based or web-based interface that allows for a virtual studio, environment control interface, and editing interface for the creation of studio production visual content including a two or more remote participants. For example, the system 100 may include a web-based or cloud-based front end application 104, hosted on a device associated with each participant 102 and in communication with a cloud-based back end API 106. The front end application 104 interface may include a plurality of control options as well as instructions for use of recording image data via an image device local to the computing device (e.g., a webcam or device equipped/built-in-camera). In some cases, the plurality of control options may include options to trigger or program studio events (e.g., play pre-recorded video clips, add animation, add sound effects, and the like), visual controls (e.g., lighting, color, contrast, and the like), position participants relative to the studio, adjust image device settings (e.g., angles, width, shutters, zooms, and the like), as well as other control options. The front end 104 may provide the captured image data and audio data as well as any metadata, any user interactions or inputs with the front end 104, or the like to the cloud-based backend 106.

The front end 104 may also provide the image data and audio data for each participant (e.g., the participant track or data 112) to a WebRTC system 108 that allows for the participants 102 and/or viewers to consume the virtual studio content as a live streaming session or as a live preview 116 streaming session as the session is recorded. Both the backend 106 and the WebRTC system 108 may be in communication with a cloud-based vision system 110 that may apply one or more processes to the participant tracks. For example, via the front end 104 and the backend system 106, one or more of the participants 102 may select, based at least in part on viewing the live stream session, configurations or processes 114 to be applied to one or more of the participant tracks or data 112 for each participant by the vision system 110.

In some cases, the configurations or processes 114 may include one or more of a machine learned model based background segmentation (e.g., via a deep learning model or the like trained on image data including visual representation of users and various types of backgrounds in various lighting settings from multiple systems), greenscreen removal processes (such as via a deep learning model trained on green screen examples, segmented end-to-end results or video content, video data with varying lighting effects or conditions, video data with varying green screen wrinkles, shadows, or other imperfect conditions), discussed in more detail herein, avatar motion capture, three-dimensional (3D) human construction (e.g., avatar construction), audio processing for noise removal, audio processing to improve audio quality, object (e.g., background and human) resizing, cropping, arrangement, and the like. Accordingly, after applying the selected configurations and/or process 114 to the participant data 112 for each participant 102, the vision system 110 may generate processed data 118 for each participant 102.

The backend 106 and the cloud-based vision system 110 may also be in communication with a cloud-based rendering system 120. The cloud-based vision system 110 may provide the processed data 118 (e.g., processed image data and audio data) for each participant 102 to the rendering system 120 and the backend 106 may provide actions or processes 122 selected by one or more of the participants 102 to be performed on the processed data 118 for each participant 102 by the rendering system 120. For example, the cloud-based rendering system 120 may apply a game application or simulation engine (such as a 3D real-time simulation, 3D animation rendering engine, architectural visualization, background generation, illumination rendering, physical-based-rendering (PBR), 3D object rendering and interaction engine, and the like) to render a virtual 3D studio or background including animations and/or actions that may be triggered by one or more of the participants 102 during a recording session.

The cloud-based rendering system 120 may also be configured to synchronize the processed data 118 for each participant 102 and to insert the processed data 118 into the rendered background studio. In this manner, the rendering system 120 may generate a preview data 124 that includes processed data 118 from each participant 102 in a single virtual environment or background (e.g., studio) that is rendered in substantially real-time once the live streaming session is initiated.

In some cases, the preview data 124 may be provided to the WebRTC system 108 for use in the live preview of the streaming session to the participants 102. In this manner, one or more of the participants 102 may be able to access or control other participants image devices, microphones, displays, screenshares, and the like, map participants to locations within the rendered studio or environment, upload image spots and/or audio tracks (e.g., videos, clips, stills, audio sounds, or other visual/audio tracks or spots) and/or place the uploaded image spots and/or audio tracks within the rendered studio or environment, select streaming services or applications for the live session, set or select greenscreen background segmentation options (e.g., background removal), adjust settings such as audio levels, brightness, and the like for each individual participant 102, select features for the rendered studio or environment (e.g., color pallet, lighting, theme, tables, desks, virtual displays, and other look and feel decisions), and the like. Thus, the participants 102 may preconfigure the live stream session while viewing or consuming the live preview data 124 of the rendered studio or environment.

Once a live stream session is initiated for viewing by one or more viewers, the cloud-based rendering system 120 may also provide the preview data 124 to a video encoding system 126 to encode the preview data 124 into a streaming data 128 for post-production editing or posting to a website, social media account, or other hosted service and accessible to one or more viewers, generally indicated by 130(1)-(X). The video encoding system 126 may generate the streaming data 128 as a session for use at a later time, such as additional post editing and further publication as discussed below in more details.

In the current example, the WebRTC 108, the cloud-based vision system 110, and the cloud-based rendering system 120 may be part of a live preview system 132. The live preview system 132 may be configured to provide the live preview stream of the session as the session is recorded by the participants 102. The system as discussed herein may also include a post recording system or post recording production system that may be utilized to provide further editing, post-production services, and the like prior to publication, as discussed in more details below.

Figure 2:
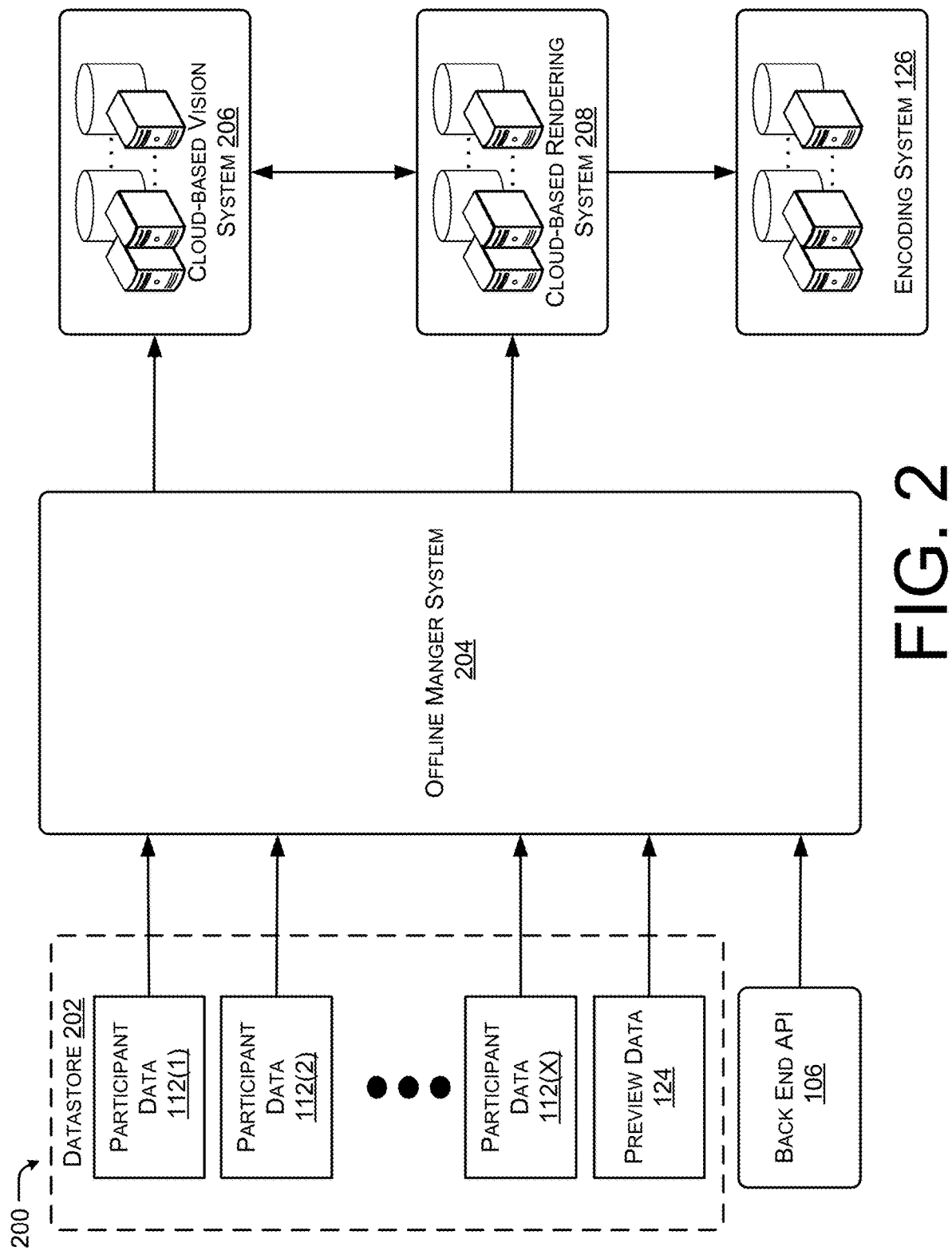
FIG. 2 illustrates an example of a cloud-based system for applying post recording editing to streaming content or data for remote participants in a virtual studio setting according to some implementations.

FIG. 2 illustrates an example of a cloud-based system 200 for applying post recording editing to streaming content or data for remote participants in a virtual studio setting according to some implementations. For instance, the system 200 may include a cloud-based datastore 202 that receives and stores the participant data 112(1)-(X) associated with each of the one or more participants associated with a remote studio production filming session. The cloud-based datastore 202 may also store the preview data 124 generated by the system 100, discussed above with respect to FIG. 1. In some cases, the cloud-based datastore 202 may also store the selection of actions and/or configurations selected by one or more of the participants during recording, any studio events applied to the preview data 124, model training data (e.g., green screen examples, segmented end-to-end results or video content, video data with varying lighting effects or conditions, video data with varying green screen wrinkles, shadows, or other imperfect conditions, and the like).

In some cases, an offline manager system 204 (or an offline vision system and an offline rendering system) may be configured to allow one or more of the participants or an additional editor to generate a post recording production quality version of the session for further publication.

In the current example, the offline manager system 204 may also receive configurations and actions, as discussed herein, from the backend 106. The offline manager system 204 may provide a user interface and/or machine learned model to load, combine, and temporally align the participant data 112 (e.g., the image data and/or audio data) for each participant for providing to the vision system 110 and/or the rendering system 120. The offline manager system 204 may also provide a user interface and/or machine learned model to load, combine, and temporally align the studio events or actions selected by the participants with the participant data 112. For example, an example timeline user interface is discussed in more detail below with respect to FIG. 4. In some cases, the offline manager system 204 may utilize the preview data 124 to assist in loading, combining, and aligning the participant data 112 and the studio events.

Once aligned the offline manager system 204 may be configured to provide the participant data 112, the studio events, any selected configuration or actions, and the like to the vision system 110 and/or the rendering system 120 at the appropriate time. For example, the offline manager system 204 may in some cases be in communication with the cloud-based vision system 206 and the cloud-based rendering service 208. In some cases, the cloud-based vision system 206 and the cloud-based rendering service 208 may be the cloud-based vision system 110 and the cloud-based rendering service 120 of FIG. 1 to utilize the cloud-based vision system 110 and the cloud-based rendering service 120 in an offline setting (opposed to during the session to generate the preview data 124). For instance, the live or offline setting of the cloud-based vision system 110 and the cloud-based rendering service 120 may be set via a flag received during the live recording session or during post-production editing, such as from the offline manager system 204. However, the offline manager system 204 may also be in communication with a separate cloud-based vision system 206 and cloud-based rendering service 208, as shown, such as when the live systems and offline systems are distinct.

As discussed above, the visions system 206 may also provide the processed data (e.g., the processed participant data) to the rendering system 208 in some cases. The cloud-based rendering system 208 may then provide the rendered session data to the encoding system 126 for encoding and publishing to one or more publication services, such as a social media, streaming systems, or the like.

Figure 3:
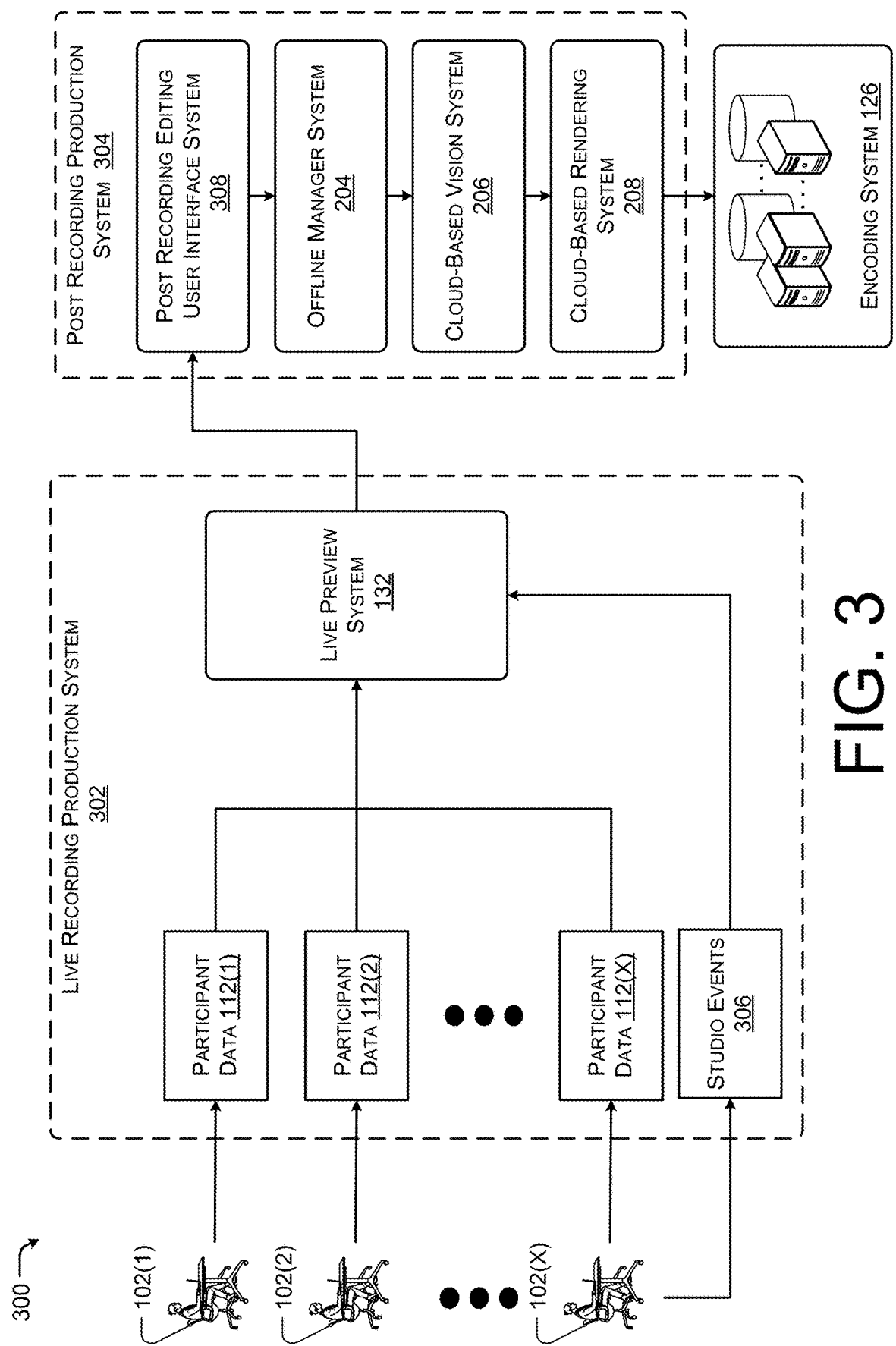
FIG. 3 illustrates an example of a cloud-based system for generating live streaming preview sessions and applying post recording editing to streaming content or data for remote participants in a virtual studio setting according to some implementations.

FIG. 3 illustrates an example of a cloud-based system 300 for generating live streaming preview sessions and applying post recording editing to streaming content or data for remote participants in a virtual studio setting according to some implementations. In the current example, the system 300 includes live recording production 302 and post recording production systems 304. In general, the live recording production system 302 includes the systems as described above with respect to FIG. 1 and the post recording production system 304 includes the systems as described above with respect to FIG. 2.

For example, the live recording production system 302 may receive at a live preview system 132 the participant data 112(1)-(X) as captured by a user device associated with each participant 102(1)-(X). The live preview system 132 may also receive studio events 306 selected by one or more of the participants, such as participant 102(X) as shown. For example, the studio events 306 may include pre-recorded video clips, animation, sound effects, and the like that may be triggered by the participant 112(X) during the live recording session. Each of the studio events 306 may be time stamped with respect to the participant data 112, such that the live preview system 132 may temporally align the participant data 112 and the studio events 306 in the rendered studio represented by the live preview data, as discussed herein.

The live preview system 132 may generate and stream a live preview of the recording that may be consumed by the participants 102 and/or other viewers. As discussed above, the system 300 may store the participant data 112 for each participant 102 as well as the time stamped studio events 306 for use by the post recording production system 304. For example, once the live recording session is complete, the live recording production system 302 may provide the participant data 112 for each participant 102, the time stamped studio events 306, the live preview data, and the like to the post recording production system 304.

As discussed above, the post recording production system 304 may include a post recording editing user interface system 308, the office manager 204, the cloud-based vision system 206, and the cloud-based rendering system 208. In some cases, the post recording editing user interface system 308 that may allow one or more of the participants 102 and/or a third party, such as an editor, to adjust positions of the participants 102 or objects (such as props, actions, or the like) within the virtual studio, as well as select any configurations or actions for application by the cloud-based vision system 206 and/or the cloud-based rendering system 208.

The offline manager system 204 may then provide the participant data 112, the studio events 306 to the cloud-based vision system 206 and/or the cloud-based rendering system 208 for further processing. The offline manager system 204 may also manage any configurations or actions selected by the editor for application by the cloud-based vision system 206 and/or the cloud-based rendering system 208. For example, the configurations and/or actions performed by the cloud-based vision system 206 and/or the cloud-based rendering system 208 may include one or more of background segmentation of the participant data 112, greenscreen removal from the participant data 112, avatar motion capture associated with the participant data 112, 3D human construction associated with the participant data 112, audio processing (e.g., noise reduction, background noise removal or filtering, and the like), resizing, cropping, lighting adjustments, inserting actions, generating and inserting animations, combinations thereof, and the like.

In some cases, the post recording production system 304 may also provide the rendered session data to the encoding system 126 for encoding and publishing to one or more publication services, such as a social media, streaming systems, or the like.

Figure 4:
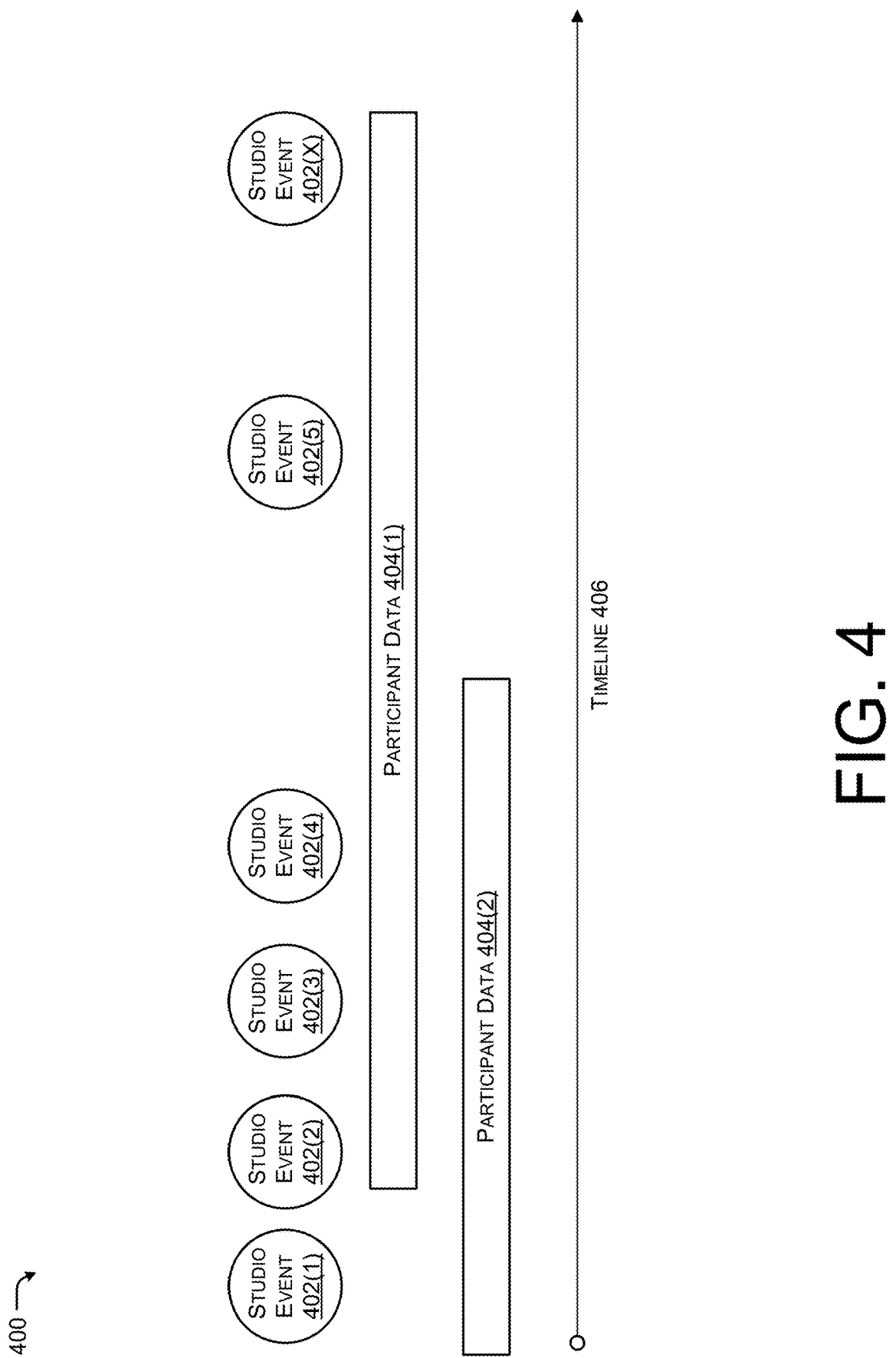
FIG. 4 illustrates an example portion of a user interface associated with a cloud-based system for applying post recording editing to streaming content or data for remote participants in a virtual studio setting according to some implementations.

FIG. 4 illustrates an example portion of a user interface 400 associated with a cloud-based system of FIGS. 1-3 for applying post recording editing to streaming content or data for remote participants in a virtual studio setting according to some implementations. In the current example, a participant or third party editor may access recorded session data that includes a plurality of studio events, such as studio events 402(1)-(X), and participant data associated with one or more participants in the studio session and rendering, such as participant data 404(1) and 404(2). In the current example, the editor may select (e.g., drop and drop, select and move, delete, add, and the like) the studio events 402 and the participant data 404 with respect to the timeline 406. In this manner, the studio events 402 and the participant data 404 (e.g., the image data and audio data) may be adjusted relative to each other within the rendered studio session data.

Figure 5:
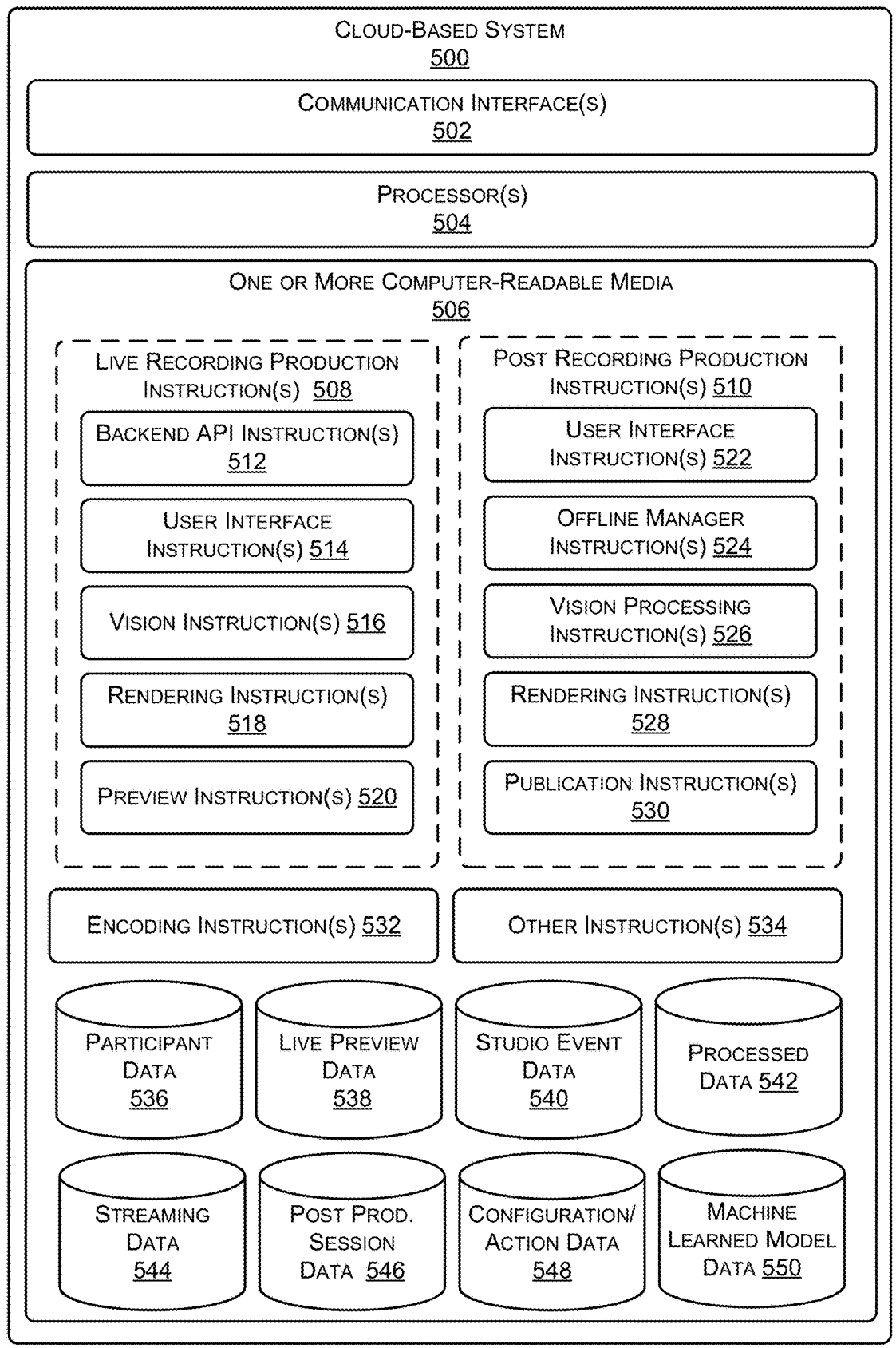
FIG. 5 is an example cloud-based system associated with generating live streaming preview sessions and applying post recording editing to streaming content or data for remote participants in a virtual studio setting according to some implementations.

FIG. 5 is an example cloud-based system 500 associated with generating live streaming preview sessions and applying post recording editing to streaming content or data for remote participants in a virtual studio setting according to some implementations. As described above, the cloud-based system 500 may be used to generate a virtual studio setting both as a live stream preview session and a post recording production work that is a publication ready product.

The cloud-based system 500 may also include one or more communication interfaces 502 configured to facilitate communication between one or more networks and/or one or more cloud-based services, such as participant devices. The communication interfaces 502 may also facilitate communication between one or more wireless access points, a master device, and/or one or more other computing devices as part of an ad-hoc or home network system. The communication interfaces 502 may support both wired and wireless connection to various networks, such as cellular networks, radio, WiFi networks, short-range or near-field networks (e.g., Bluetooth®), infrared signals, local area networks, wide area networks, the Internet, and so forth.

The cloud-based system 500 may also include one or more processors 504, such as at least one or more access components, control logic circuits, central processing units, or processors, as well as one or more computer-readable media 506 to perform the function associated with the virtual environment. Additionally, each of the processors 504 may itself comprise one or more processors or processing cores.

Depending on the configuration, the computer-readable media 506 may be an example of tangible non-transitory computer storage media and may include volatile and non-volatile memory and/or removable and non-removable media implemented in any type of technology for storage of information such as computer-readable instructions or modules, data structures, program modules or other data. Such computer-readable media may include, but is not limited to, RAM, ROM, EEPROM, flash memory or other computer-readable media technology, CD-ROM, digital versatile disks (DVD) or other optical storage, magnetic cassettes, magnetic tape, solid state storage, magnetic disk storage, RAID storage systems, storage arrays, network attached storage, storage area networks, cloud storage, or any other medium that can be used to store information and which can be accessed by the processors 504.

Several modules such as instruction, data stores, and so forth may be stored within the computer-readable media 506 and configured to execute on the processors 504. For example, as illustrated, the computer-readable media 506 stores both live recording production instructions 508 and a post recording production instructions 510. The live recording production instructions 508 may include backend API instructions 512, user interface instructions 514 (to control the live preview streaming session, insert studio events, select configurations, select actions, adjust participants, studio features, objects, and the like within the live preview streaming session, and the like), vision instructions 516 (to provide pre-processing applications), rendering instructions 518 (to apply game engine applications), and preview instructions 522 (to enable a live preview streaming session). The post recording production instructions 510 may include user interface instructions 522 (to allow for post recording editing, such as timeline adjustment), offline manager instructions 524 (to manage the vision instructions 526 and the rendering instructions 528), vision instructions 526 (to provide pre-processing applications), rendering instructions 528 (to apply game engine applications), and publication instructions 530 (to assist with publishing the final rendered session data to a publication service). The computer-readable media 506 may also store encoding instructions 532 as well as other instructions 534.

The computer-readable media 506 may also store data usable by the instructions 508-534 to perform operations. The data may include participant data 536 (e.g., image data and/or audio data), live preview data 538 generated by the live recoding production instructions 508, studio event data 540, process data 542 (such as data generated by the vision instructions 516 or 526), post production session data 546 generated by the post recording production instructions 510, configuration and/or action data 548, machine learned model data 550 (such as trained models utilized by the vision instructions 516 or 526, the rendering instructions 518 or 528, the offline manager instructions 524, or the like), and the like.

As described herein, the machine learned models 550 may be generated using various machine learning techniques. For example, the models 550 may be generated using one or more neural network(s) or other deep learning network. A neural network may be a biologically inspired algorithm or technique which passes input data (e.g., image and sensor data captured by the IoT computing devices) through a series of connected layers to produce an output or learned inference. Each layer in a neural network can also comprise another neural network or can comprise any number of layers (whether convolutional or not). As can be understood in the context of this disclosure, a neural network can utilize machine learning, which can refer to a broad class of such techniques in which an output is generated based on learned parameters.

As an illustrative example, one or more neural network(s) may generate any number of learned inferences or heads from the captured sensor and/or image data. In some cases, the neural network may be a trained network architecture that is end-to-end. In one example, the machine learned models may include segmenting and/or classifying extracted deep convolutional features of the sensor and/or image data into semantic data. In some cases, appropriate truth outputs of the model in the form of semantic per-pixel classifications (e.g., vehicle identifier, container identifier, driver identifier, and the like).

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like. In some cases, the system may also apply Gaussian blurs, Bayes Functions, color analyzing or processing techniques and/or a combination thereof.

In the current example, the system 500 is illustrated as a single system but it should be understood that the system 500 may be implemented over multiple servers and cloud-based computing resources. For example, the post recording production system 304 and the live recording production system 302 may be implemented as separate servers or the like.

FIGS. 6-9 are flow diagrams illustrating example processes associated with generating a virtual studio environments for remote participants according to some implementations. The processes are illustrated as a collection of blocks in a logical flow diagram, which represent a sequence of operations, some or all of which can be implemented in hardware, software or a combination thereof. In the context of software, the blocks represent computer-executable instructions stored on one or more computer-readable media that, which when executed by one or more processors, perform the recited operations. Generally, computer-executable instructions include routines, programs, objects, components, encryption, deciphering, compressing, recording, data structures and the like that perform particular functions or implement particular abstract data types.

The order in which the operations are described should not be construed as a limitation. Any number of the described blocks can be combined in any order and/or in parallel to implement the process, or alternative processes, and not all of the blocks need be executed. For discussion purposes, the processes herein are described with reference to the frameworks, architectures and environments described in the examples herein, although the processes may be implemented in a wide variety of other frameworks, architectures or environments.

Figure 6:
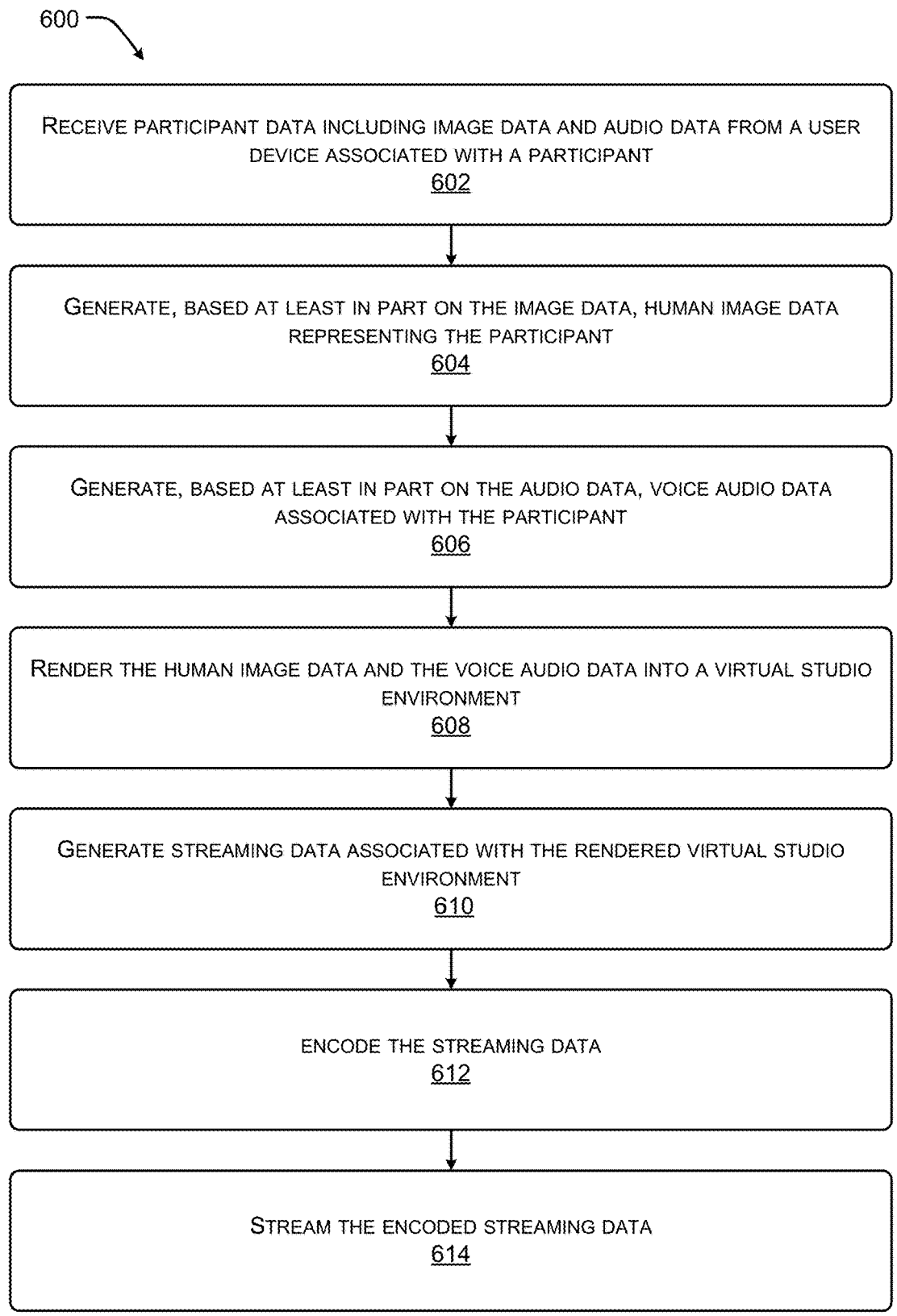
FIG. 6 is an example flow diagram showing an illustrative process for generating a virtual studio environment for remote participants according to some implementations.

FIG. 6 is an example flow diagram showing an illustrative process 600 for generating a virtual studio environment for remote participants according to some implementations. As discussed above, a cloud-based system may be configured to provide a virtual studio environment for the creation of streamable content. The streamable content may be both for use in a live preview session and a post-production version that may be consumed after recording is complete.

At 602, the system may receive participant data including image data and audio data (e.g., participant data) from a user device associated with a participant. In some cases, the image data may be captured by multiple image devices and the audio data may likewise be captured by multiple microphones. In some cases, the system may also receive additional image data and additional audio data (e.g., additional participant data) from one or more additional participants in the virtual studio environment.

At 604, the system may generate, based at least in part on the image data, human image data representing the participant. For example, the system may perform background segmentation on the image data. The segmented image data may then be input into one or more machine learned models trained to remove a greenscreen and/or backgrounds from the image data and to output the image data representative of the participant (e.g., the human image data). In some cases, the system may also perform 3D reconstruction on the human image data to further isolate and complete any holes in the human image data introduced by the background removal. The system may also perform motion capture for avatar control on the human image data (e.g., the before, currently with, or after the 3D reconstruction). The system may also perform any resizing, additional cropping, or other image processing technique on the human image data prior to sending to a rendering system for insertion into the virtual studio environment. In some cases, the additional image processing technique may be performed at least in part by one or more additional machine learned models trained on human image data.

At 606, the system may generate, based at least in part on the audio data, voice audio data associated with the participant. For example, the system may apply noise cancelation, background noise suppression, noise filtering or the like to improve the overall quality of the audio data and/or to isolate the voice audio data from the general audio data of the physical environment around the participant. In some cases, the audio processing may be performed substantially concurrently with the image data processing discussed herein.

At 608, the system may render the human image data and the voice audio data into a virtual studio environment. For example, the system may utilize a game engine to render the human image data into the visual studio environment. For example, the system may add animations (e.g., associated with studio events), audio files (e.g., associated with studio events), synchronize the human image data and voice audio data for each participant with the virtual studio environment, and the like.

At 610, the system may generate streaming data associated with the rendered virtual studio environment. For example, the streaming data may include the human image data and the voice data for each participant as well as any studio event data rendered in the virtual studio environment as a cohesive content item.

At 612, the system may encode the streaming data and, at 614, stream the encoded streaming data as a publication. For example, the streaming data may be provided to an encoding system or service that compresses and formats the data based on various different requirements of different streaming platforms and services. In some cases, the encoded streaming data may be first encoded for the live preview session or real-time streaming and then be subsequently re-encoded for publication (such as in on-demand streaming services and/or evergreen content services).

Figure 7:
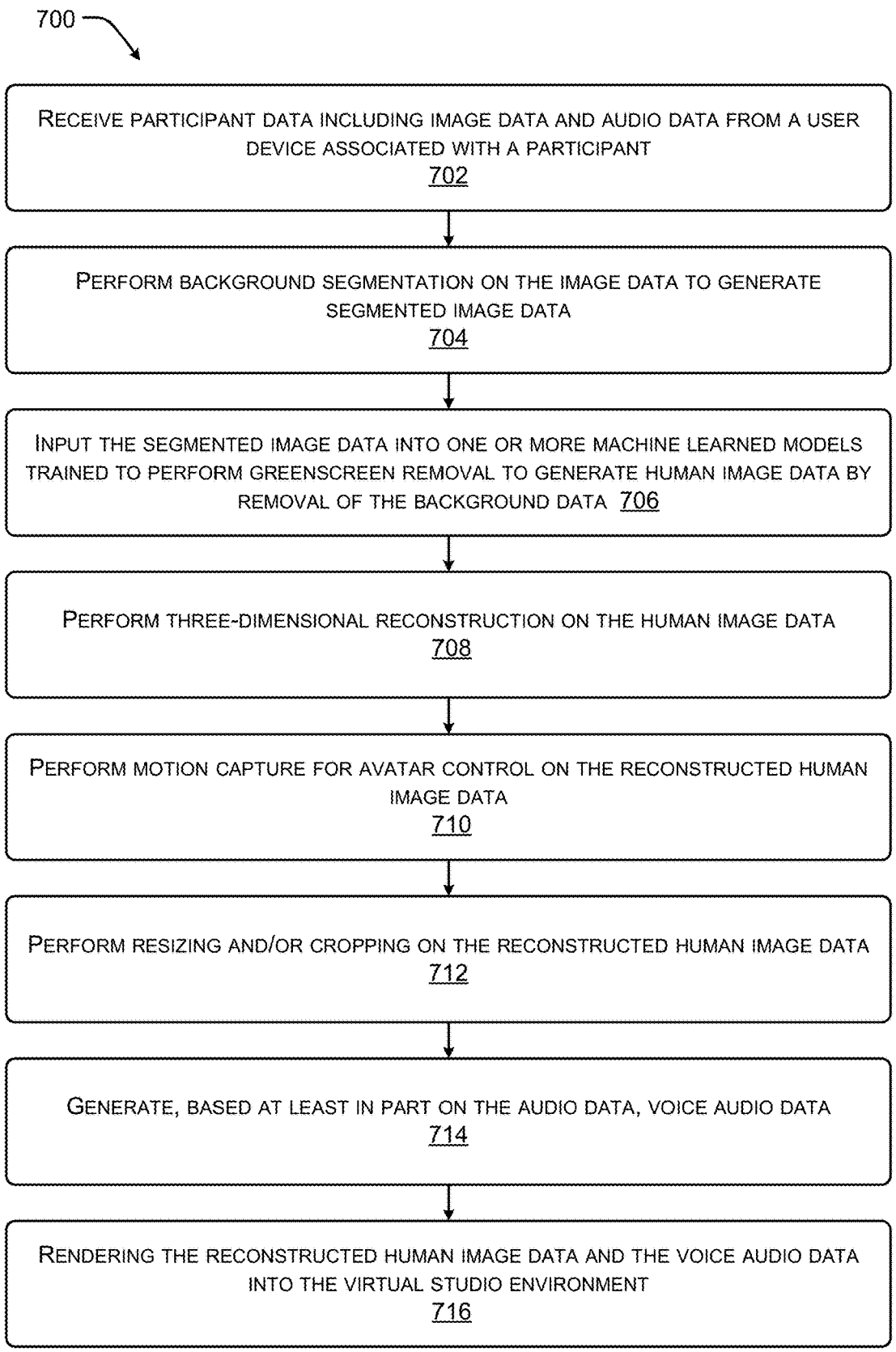
FIG. 7 is an example flow diagram showing an illustrative process for rendering a virtual studio environment for remote participants according to some implementations.

FIG. 7 is an example flow diagram showing an illustrative process 700 for rendering a virtual studio environment for remote participants according to some implementations. As discussed above, a cloud-based system may be configured to provide a virtual studio environment for the creation of streamable content. The streamable content may be both for use in a live preview session and a post-production version that may be consumed after recording is complete. In the current example, the process 700 illustrates an example process for the image data and audio data for each participant being rendered into the shared virtual studio environment prior to either live streaming and/or post-production processing.

At 702, the system may receive participant data including image data and audio data (e.g., participant data) from a user device associated with a participant. In some cases, the image data may be captured by multiple image devices and the audio data may likewise be captured by multiple microphones. In some cases, the system may also receive additional image data and additional audio data (e.g., additional participant data) from one or more additional participants in the virtual studio environment.

At 704, the system may perform background segmentation on the image data to generate segmented image data.

At 706, the system may input the segmented image data into one or more machine learned models trained to perform greenscreen removal to generate human image data by removal of the background data. For example, the system may utilize one or more deep learning models or neural networks that are trained on human image data with various backgrounds, greenscreen conditions (e.g., lighting, wrinkles, color variations, stains, and the like), lighting conditions, clothing conditions and colors, presence of objects (e.g., hand-held objects, hats, ceiling based obstruction, and the like), and the like.

At 708, the system may perform 3D reconstruction on the human image data. For example, the system may generate 3D representation of a human subject from two-dimensional image data. In some cases, the system may utilize feature extraction techniques (e.g., facial or body landmark processing techniques, depth estimation techniques, mesh or point cloud based reconstruction techniques, texture mapping techniques, and the like).

At 710, the system may perform motion capture for avatar control on the reconstructed human image data.

At 712, the system may perform resizing, cropping, or other additional image processing on the reconstructed human image data. For example, the additional image processing may be performed on the human image data prior to sending to a rendering system for insertion into the virtual studio environment. In some cases, the additional image processing technique may be performed at least in part by one or more additional machine learned models trained on human image data.

At 714, the system may generate, based at least in part on the audio data, voice audio data associated with the participant. For example, the system may apply noise cancelation, background noise suppression, noise filtering or the like to improve the overall quality of the audio data and/or to isolate the voice audio data from the general audio data of the physical environment around the participant. In some cases, the audio processing may be performed substantially concurrently with the image data processing discussed herein.

At 716, the system may render the human image data and the voice audio data into a virtual studio environment. For example, the system may utilize a game engine to render the human image data into the visual studio environment. For example, the system may add animations (e.g., associated with studio events), audio files (e.g., associated with studio events), synchronize the human image data and voice audio data for each participant with the virtual studio environment, and the like.

Figure 8:
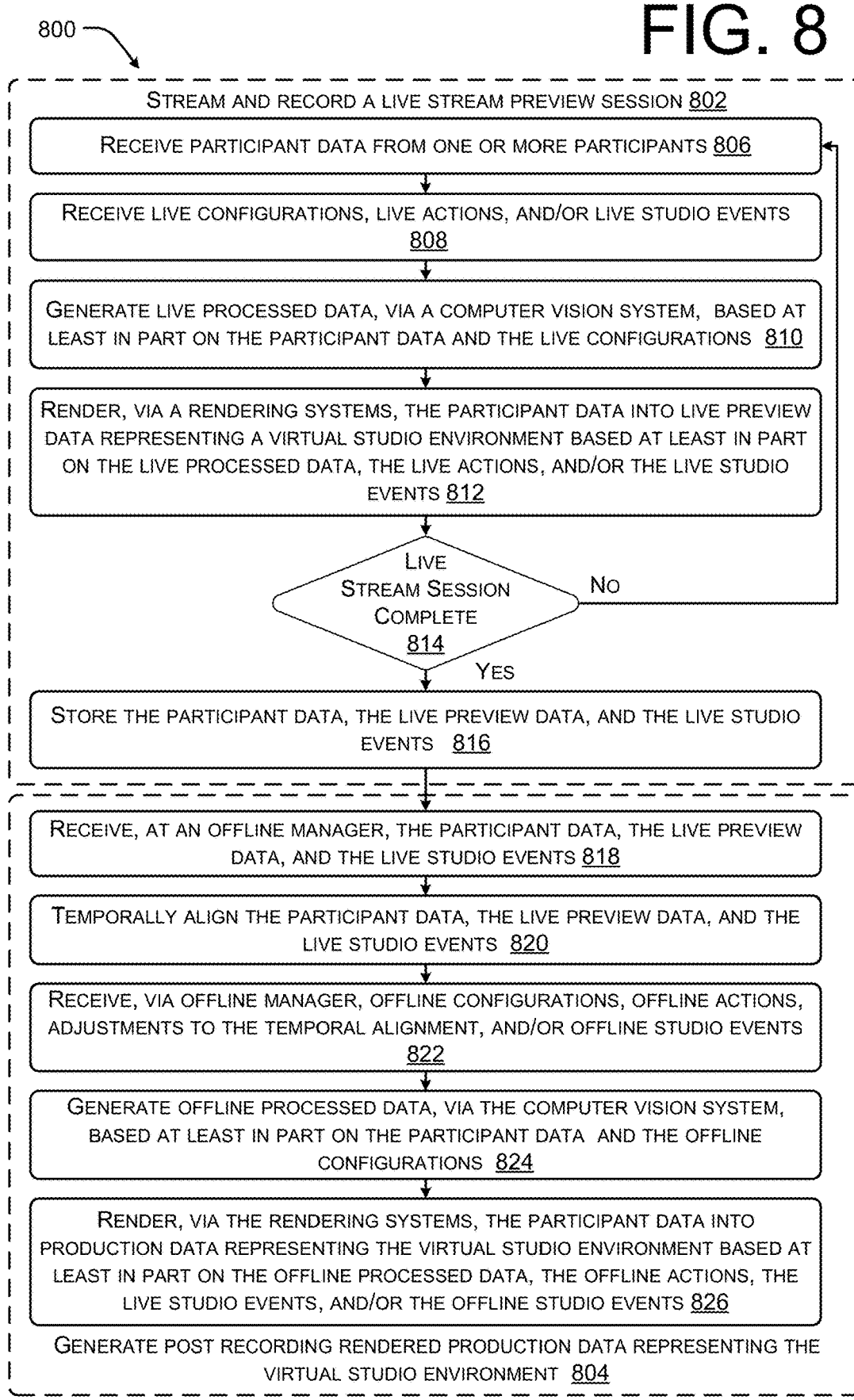
FIG. 8 is an example flow diagram showing an illustrative process for rendering a live preview and a post-production version of a virtual studio environment for remote participants according to some implementations.

FIG. 8 is an example flow diagram showing an illustrative process 800 for rendering a live preview and a post-production version of a virtual studio environment for remote participants according to some implementations. As discussed above, a cloud-based system may be configured to provide a virtual studio environment for the creation of streamable content. The streamable content may be generated both by a live preview process 802 and a post-production process 804 (e.g., for content that may be consumed after recording is complete, such as via an on-demand streaming service).

At 806, the system may receive participant data from a user device associated with one or more participants. In some cases, the participant data for each participant may be captured by multiple image devices and multiple microphones.

At 808, the system may receive live configurations, live actions, and/or live studio events. For example, the configurations and/or actions performed by the cloud-based vision system and/or the cloud-based rendering system may include one or more of background segmentation of the participant data, greenscreen removal from the participant data, avatar motion capture associated with the participant data, 3D human construction associated with the participant data 112, audio processing (e.g., noise reduction, background noise removal or filtering, and the like), resizing, cropping, lighting adjustments, inserting actions, generating and inserting animations, combinations thereof, and the like. In some cases, the studio events may include animations, videos, objects, audio clips, and the like to be included in the rendered virtual studio environment.

At 810, the system may generate live processed data (e.g., human image data discussed herein), via a computer vision system, based at least in part on the participant data and the live configurations. For example, the system may perform steps 704-712 of process 700 to generate the live processed data for each participant.

At 812, the system may render, via a rendering systems, the participant data into live preview data representing a virtual studio environment based at least in part on the live processed data, the live actions, and/or the live studio events. For example, the rendering systems may include a game engine operating in substantially real-time to generate a rendered virtual studio environment with one or more participants and the studio events as a single streamable content item.

At 814, the system may determine if the live stream session is complete. If the session is not complete, the process 800 may return to 806 and receive additional participant data from each of the participants in the live preview session currently being recorded. However, if the live stream session is completed or terminated by one or more of the participants, the process 800 may advance to 816 and store the participant data, the live preview data (e.g., the rendered streamable content item), and the live studio events (e.g., timestamped live studio events), such as to a cloud-based datastore.

At 818, the system may receive, at an offline manager, the participant data, the live preview data, and the live studio events and, at 820, the offline manager may temporally align the participant data, the live preview data, and the live studio events. For example, the offline manager may provide a user interface, such as illustrated with respect to FIG. 4 above, to allow a user to adjust and align the participant data, the live preview data, and the live studio events.

At 822, the system may receive, via offline manager, offline configurations, offline actions, adjustments to the temporal alignment, and/or offline studio events. In this example, the offline configurations, the offline actions, and/or the offline studio events may be similar to the live configurations, the live actions, and/or the live studio events but include a larger selection of available options as the associated processing may be performed offline opposed to in substantially real-time. In other cases, the offline configurations, the offline actions, and/or the offline studio events may be similar to the live configurations, the live actions, and/or the live studio events but performed at a high quality or higher resolution.

At 824, the system may generate offline processed data (e.g., human image data), via the computer vision system, based at least in part on the participant data and the offline configurations. For example, the system may perform steps 704-712 of process 700 to generate the offline processed data for each participant.

At 826, the system may render, via the rendering systems, the participant data into production data representing the virtual studio environment as a single streamable content item based at least in part on the offline processed data, the offline actions, the live studio events, and/or the offline studio events. For example, the system may utilize a game engine to render the human image data into the visual studio environment. For example, the system may add animations (e.g., associated with studio events), audio files (e.g., associated with studio events), synchronize the human image data and voice audio data for each participant with the virtual studio environment, and the like.

Figure 9:
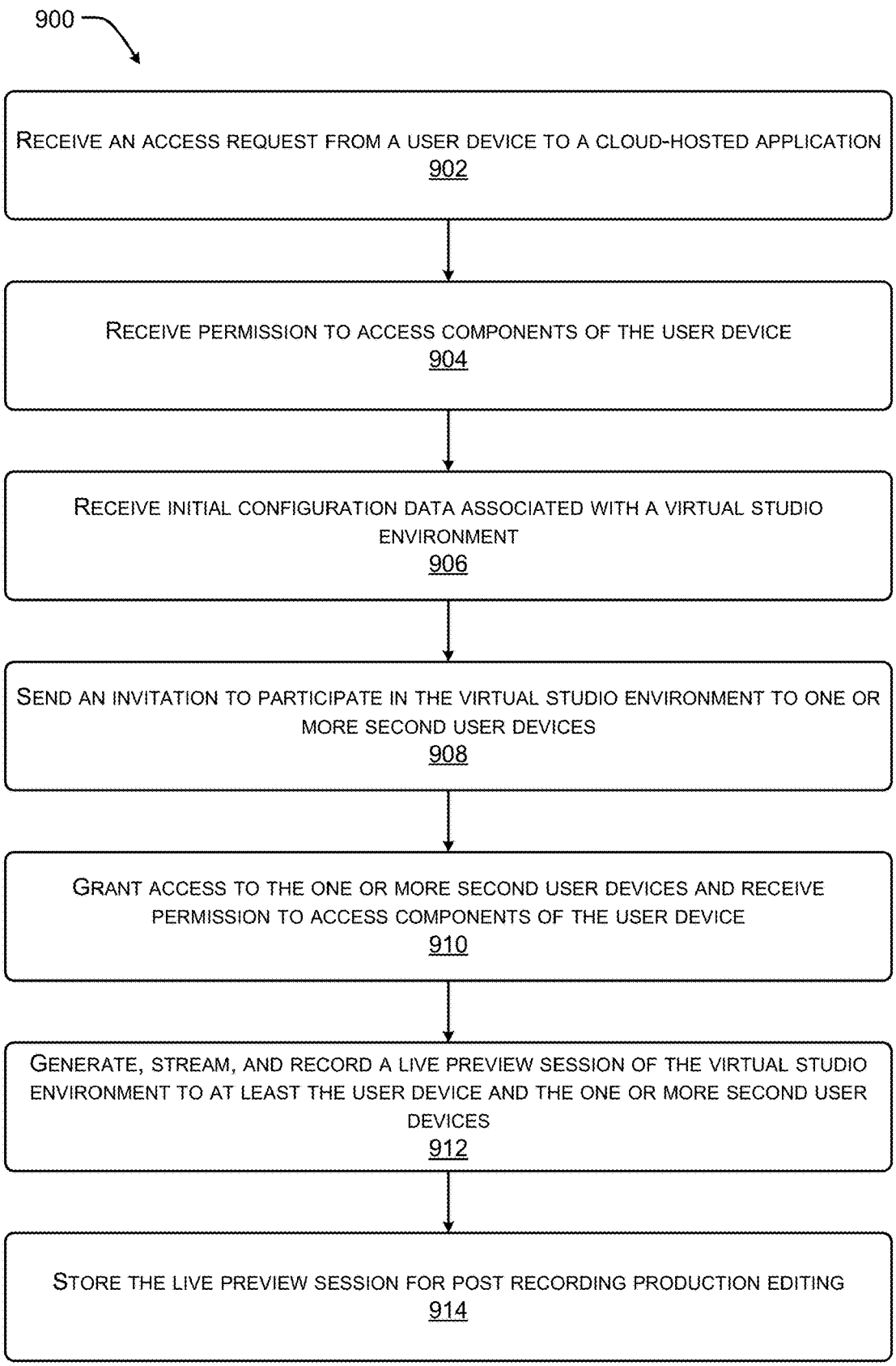
FIG. 9 is an example flow diagram showing an illustrative process for rendering a live preview of a virtual studio environment for remote participants according to some implementations.

FIG. 9 is an example flow diagram showing an illustrative process 900 for rendering a live preview of a virtual studio environment for remote participants according to some implementations. As discussed above, a cloud-based system may be configured to provide a virtual studio environment for the creation of streamable content for remote participants. During a recording session, the system may generate a live preview stream of the virtual studio environment including image data representing each of the participants.

At 902, the system may receive an access request from a user device to a cloud-hosted application. For example, the request may be from a host participant device that is preparing to hold a virtual studio recording session including at least one remote participant.

At 904, the system may receive permission to access components of the user device. For example, the system may seek permission to control the audio device and the image devices of the user device to adjust various settings and parameters (e.g., shutter, zooms, angles, tilts, focus, frame rate, microphone levels, on-device background noise suppression, and the like).

At 906, the system may receive initial configuration data associated with a virtual studio environment. As discussed above the configuration data may include selection of processes to apply to the image data and/or audio data received from the participants devices. For example, the configuration may include background segmentation, greenscreen removal, avatar motion capture, 3D human construction, noise reduction, background noise removal or filtering, resizing, cropping, lighting, and the like. In some cases, the configuration may also include controls or user interface configurations for use during the live recording session. For example, the user interface may include selection of features of the virtual studio environment, available studio events, participant positions relative to the virtual studio environment, available virtual objects (such as via a virtual reality capture session), and the like.

At 908, the system may send an invitation to participate in the virtual studio environment to one or more second user devices. For example, the request may be for a second or a third participant to join the recording session.

At 910, the system may grant access to the one or more second user devices and receive permission to access components of the user device. In this manner, the system may provide the host participant the permission and/or the system the permission to control the audio device and the image devices of each of the user devices. For example, as discussed above, to adjust various settings and parameters (e.g., shutter, zooms, angles, tilts, focus, frame rate, microphone levels, on-device background noise suppression, and the like).

At 912, the system may generate, stream, and record a live preview session of the virtual studio environment to at least the user device and the one or more second user devices and, at 914, the system may store the live preview session for post recording production editing, as discussed herein.

Figure 10:
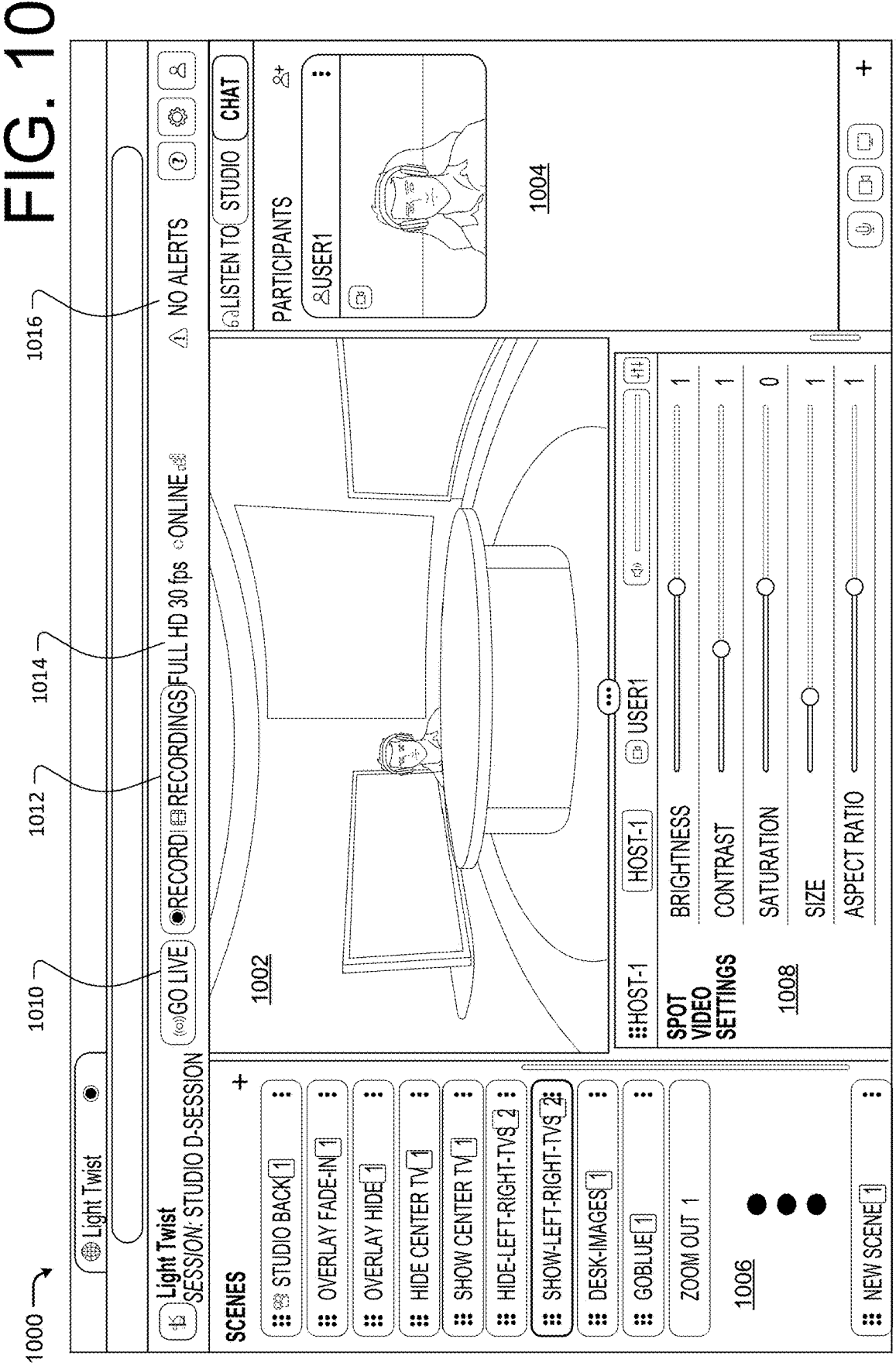
FIG. 10 is an example pictorial diagram illustrating an example portion of a user interface associated with a cloud-based system for rendering a virtual studio environment for remote participants according to some implementations.

FIG. 10 is an example pictorial diagram illustrating an example portion of a user interface 1000 associated with a cloud-based system for rendering a virtual studio environment for remote participants according to some implementations. In the current example, the user interface 1000 may include a viewing portion 1002 for viewing the rendered visual studio environment. In the current example, the rendered visual studio environment includes a first participant, a virtual desk, and multiple background screens for displaying additional content (such as studio events).

The user interface 1000 also includes a participant portion or panel 1004 to allow the participants to see their own image data as well as the image data of their fellow participants. The participant portion 1004 may also allow for a chat interface that is private to the content being streamed and viewed on the viewing portion 1002. The user interface 1000 also includes a nested control options portion 1006 to allow the participants to enable configurations, actions, and/or studio events. The user interface 1000 also includes a data capture control portion 1008. The data capture control portion 1008 may allow one or more of the participants (such as the host participant) to control the settings and parameters of the sensors of each participants device. In the current example, the data capture control portion 1008 is shown for one participant but it should be understood that the host participant may switch between participants to control each user device associated with any particular participant. In the current example, the user interface 1000 includes a Go live option 1010, a record option 1012, a video quality option 1014, an alert section 1016, and the like.

FIG. 11 is another example pictorial diagram illustrating an example portion of a user interface 1100 associated with a cloud-based system for rendering a virtual studio environment for remote participants according to some implementations. In the current example, the user interface 1100 may include a viewing portion 1102 for viewing the rendered visual studio environment. In the current example, the rendered visual studio environment includes a first participant, a virtual desk, and multiple background screens for displaying additional content (such as studio events).

The user interface 1100 also includes a background removal or configuration selection portion or panel 1104 to allow the participants to select their background removal or other configuration settings. For example, as illustrated the participant may select if they are using a greenscreen or not, select segmentation options, and the like.

The user interface 1100 also includes a nested control options portion 1106 to allow the participants to enable configurations, actions, and/or studio events. The user interface 1100 also includes a data capture control portion 1108. As discussed above, the data capture control portion 1108 may allow one or more of the participants (such as the host participant) to control the settings and parameters of the sensors of each participants device. In the current example, the data capture control portion 1108 is shown for one participant but it should be understood that the host participant may switch between participants to control each user device associated with any particular participant. In the current example, the user interface 1100 includes a Go live option 1110, a record option 1112, a video quality option 1114, an alert section 1116, and the like.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A cloud-based system comprising:
a backend system in communication with a first frontend application during a recording session;
a live recording production system including:
    a live vision system in communication with the backend system;
    a live rendering system in communication with the backend system and the vision system;
    a first streaming service in communication with the rendering system and the frontend application;
a post recording production system including:
    an offline vision system in communication with the live rendering system;
    an offline rendering system in communication with the live rendering system and the offline vision system;
    an encoding system to encode in communication with offline rendering system; and
wherein the live rendering system is a first game engine and the offline rendering system is a second game engine.

2. The system of claim 1, wherein:
the backend system receives first participant data, first configurations, and first actions from a user device during the recording session;
the live vision system generates first live processed data based at least in part on the first participant data and the first configurations;
the live rendering system generates live preview data representing a virtual studio environment based at least in part on the first live processed data and the first actions;
a first streaming service streams the live preview data to the first user device during the recording session; and
the offline vision system generates first offline processed data based at least in part on the first participant data and the first configurations;
the offline rendering system generates rendered data representing a second virtual studio environment based at least in part on the first offline processed data and the first actions;
the encoding system encodes the rendered data for publication to one or more streaming services.

3. The system of claim 2, wherein:
the offline vision system and the offline rendering system are one rendering system.

4. The system of claim 3, wherein:
first processes performed by the rendering system during the recording session differs from second processes performed by the rendering system after recording session.

5. The system of claim 2, wherein the configurations include one or more of:
greenscreen removal;
avatar motion capture;
three-dimensional (3D) human construction;
avatar construction;
audio processing for noise removal;
audio processing to improve audio quality;
image data resizing, or
image data cropping.

6. The system of claim 2, wherein:
the backend system receives studio events during the recording session;
the live rendering system generates the live preview data based at least in part on the studio events; and
the offline rendering system generates the rendered data based at least in part on the studio events.

7. The system of claim 6, wherein the post recording production system further includes:
an offline manager to temporally align the studio events and the participant data and to provide the temporally aligned the studio events and the participant data to the offline vision system and the offline rendering system.

8. The system of claim 7, wherein the offline manager includes a user interface to display an interactive timeline to the first participant via the frontend application.

9. The system of claim 2, wherein:
the backend system is in communication with a second frontend application hosted by a second user device associated with a second participant physically remote from the first participant, the backend system to receive second participant data during the recording session;
the live vision system generates second live processed data based at least in part on the second participant data and the first configurations;
the live rendering system generates the live preview data representing the virtual studio environment based at least in part on the first live processed data, the live second processed data, and the first actions;
the offline vision system in communication generates second offline processed data based at least in part on the second participant data and the first configurations; and
the offline rendering system generates the rendered data representing the second virtual studio environment based at least in part on the first offline processed data, the second offline processed data, and the first actions.

10. The system of claim 1, wherein first processes performed by the live vision system during the recording session differs from second processes performed by the offline vision system after recording session.

11. A method comprising:
receiving, during a recording session, first participant data from a first user device, the first participant data including first image data representing at least a first human and a first background and first audio data including first voice data and first background noise;
performing background segmentation on the first image data to generate segmented image data;
inputting the segmented image data into machine learned model trained to perform greenscreen removal and receiving human image data as an output of the machine learned model;
generating three-dimensional reconstructed image data based at least in part on the human image data;
generating motion capture data for avatar control based at least in part on the three-dimensional reconstructed image data;
isolating, during the recording session and based at least in part on the first audio data, the first voice data from at least a portion of the first background noise;
rendering, during the recording session and based at least in part on the three-dimensional reconstructed image data, the first voice data, and the motion capture data, a virtual studio environment; and
generating, during the recording session, live streaming data representing the virtual studio environment.

12. The method of claim 11, further comprising:
receiving, during the recording session, second participant data from a second user device, the second participant data including second image data representing at least a second human and a second background and second audio data including second voice data and second background noise;
generating, during the recording session and based at least in part on the second image data, second human image data representing the second human by removing at least a portion of the second background; and
isolating, during the recording session and based at least in part on the second audio data, the second voice data from at least a portion of the second background noise; and
wherein the virtual studio environment includes the second human image data and the second voice data.

13. The method of claim 12, further comprising temporally aligning the first participant data and the second participant data, and at least one studio event selected via the first user device prior to rendering the virtual studio environment.

14. The method of claim 11, wherein the machine learned model is trained on greenscreen backgrounds having various lighting effects, wrinkles, staining, obstructions, and color variation.

15. The method of claim 11, wherein generating the first human image data representing the first human is based at least in part on one or more configuration settings selected by a first participant associated with the first participant data.

16. A method comprising:
receiving, during a recording session, first participant data from a first user device and second participant data associated with a second participant, the second participant at a physical location remote from the first participant;
performing background segmentation on the first participant data to generate first segmented image data;
inputting the first segmented image data into one or more machine learned models trained to perform greenscreen removal and receiving first human image data as an output of the one or more machine learned models;
generating first three-dimensional reconstructed image data based at least in part on the first human image data; and
generating first motion capture data for avatar control based at least in part on the first three-dimensional reconstructed image data;

generating, during the recording session and based at least in part on the second participant data, second human data representing the second participant;

generating, during the recording session and based at least in part on the first three-dimensional reconstructed image data, the first motion capture data, and the second human data, a virtual studio environment; and streaming, during the recording session, the virtual studio environment to the first user device and the second user device.

17. The method of claim 16, further comprising:

generating, after the recording session has completed and based at least in part on the first participant data, first offline human data representing the first participant;

generating, after the recording session has completed and based at least in part on the second participant data, second offline human data representing the second participant;

generating, after the recording session has completed and based at least in part on the first offline human data and the second offline human data, a second virtual studio environment including data representing the virtual studio, the first offline human data, and the second offline human data; and generating, after the recording session has completed, publication data representing the virtual studio environment for publication to a streaming service.

18. The method of claim 16, further comprising:

receiving one or more studio events associated with the virtual studio environment; and temporally aligning the one or more studio events relative to the first participant data and the second participant data; and wherein generating the virtual studio environment is based at least in part on the one or more studio events.

19. The method of claim 18, wherein temporally aligning the one or more studio events with the first participant data and the second participant data is performed after the recording session has completed.

20. The method of claim 16, wherein generating the second human data representing the second participant further comprises:

performing background segmentation on the second participant data to generate second segmented image data;

inputting the second segmented image data into the one or more machine learned models and receiving second human image data as an output of the one or more machine learned models;

generating second three-dimensional reconstructed image data based at least in part on the second human image data;

generating second motion capture data for avatar control based at least in part on the second three-dimensional reconstructed image data; and wherein generating the virtual studio environment is based at least in part on the second three-dimensional reconstructed image data and the second motion capture data.

* * * * *